(12) United States Patent
Kim et al.

(10) Patent No.: US 11,687,980 B2
(45) Date of Patent: Jun. 27, 2023

(54) METHOD OF OPERATING A SERVER AND A USER TERMINAL FOR PROVIDING ADVERTISEMENT INFORMATION, AND APPARATUS THEREOF

(71) Applicant: KAKAO CORP., Jeju-si (KR)

(72) Inventors: Seok Young Kim, Suwon-si (KR); Jang Ho Chun, Seoul (KR)

(73) Assignee: KAKAO CORP., Jeju-si (KR)

( * ) Notice: Subject to any disclaimer, the term of this patent is extended or adjusted under 35 U.S.C. 154(b) by 350 days.

(21) Appl. No.: 15/696,470

(22) Filed: Sep. 6, 2017

(65) Prior Publication Data

US 2018/0068354 A1 Mar. 8, 2018

(30) Foreign Application Priority Data

Sep. 6, 2016 (KR) .................. 10-2016-0114554

(51) Int. Cl.
| | |
|---|---|
| G06Q 30/02 | (2023.01) |
| G06Q 30/0241 | (2023.01) |
| G06F 16/9535 | (2019.01) |
| G06Q 30/0251 | (2023.01) |
| G06F 3/04842 | (2022.01) |
| G06Q 50/00 | (2012.01) |

(52) U.S. Cl.
CPC ..... *G06Q 30/0277* (2013.01); *G06F 16/9535* (2019.01); *G06Q 30/0269* (2013.01); *G06F 3/04842* (2013.01); *G06Q 50/01* (2013.01)

(58) Field of Classification Search
CPC .................. G06Q 30/0277; G06Q 30/0269
See application file for complete search history.

(56) References Cited

U.S. PATENT DOCUMENTS

| | | | |
|---|---|---|---|
| 2003/0003935 A1* | 1/2003 | Vesikivi | H04M 3/5322 455/517 |
| 2003/0195801 A1 | 10/2003 | Takakura et al. | |
| 2009/0248656 A1* | 10/2009 | Blinnikka | G06F 16/9535 |
| 2009/0312040 A1* | 12/2009 | Gupta | G06Q 30/02 455/466 |
| 2010/0205061 A1* | 8/2010 | Karmarkar | G06Q 30/02 705/14.64 |

(Continued)

FOREIGN PATENT DOCUMENTS

| | | |
|---|---|---|
| JP | 2002123477 A | 4/2002 |
| JP | 2005173873 A | 6/2005 |

(Continued)

OTHER PUBLICATIONS

Scanned book images from Webster's New World College Dictionary, Fourth Edition; Hardcover; by Michael E. Agnes; ISBN 10: 0-02-863474-8; and ISBN 13: 9780028634746 (Year: 1999).*

(Continued)

*Primary Examiner* — Mathew R. Syrowik
(74) *Attorney, Agent, or Firm* — Cantor Colburn LLP

(57) ABSTRACT

Provided is a method of operating a server to provide advertising information, the method including receiving a query from a user terminal of at least one user among users that participate in a chatroom, the query being created based on link information included in a message in the chatroom; acquiring advertising information corresponding to the link information; and providing a response signal that includes the advertising information to the user terminal in response to the query. The advertising information is determined to correspond to an entity that is determined based on the link information.

8 Claims, 9 Drawing Sheets

(56) References Cited

U.S. PATENT DOCUMENTS

| | | | | | |
|---|---|---|---|---|---|
| 2012/0202533 | A1* | 8/2012 | Abhari | ............... | H04W 4/21 455/466 |
| 2012/0284093 | A1* | 11/2012 | Evans | ............... | H04W 4/21 705/14.1 |
| 2012/0303445 | A1* | 11/2012 | Jablokov | ............ | G06Q 30/02 705/14.42 |
| 2013/0145418 | A1* | 6/2013 | Stein | .................. | G06F 21/56 726/1 |
| 2014/0074618 | A1* | 3/2014 | Agarwal | ......... | G06Q 30/0267 705/14.64 |
| 2014/0164183 | A1 | 6/2014 | Tang | | |
| 2014/0173003 | A1* | 6/2014 | Van | .................. | H04W 4/12 709/206 |
| 2015/0067609 | A1* | 3/2015 | Moon | ............... | G06F 3/04817 715/835 |
| 2015/0324858 | A1* | 11/2015 | DeMattei | ........... | H04L 51/08 705/14.64 |
| 2016/0283984 | A1* | 9/2016 | Rabbat | .............. | H04L 51/18 |

FOREIGN PATENT DOCUMENTS

| | | |
|---|---|---|
| JP | 2014521156 A | 8/2014 |
| KR | 100906488 B1 | 7/2009 |
| KR | 101436427 B1 | 9/2014 |
| KR | 1020140144364 A | 12/2014 |
| KR | 1020150098538 A | 8/2015 |
| KR | 101561289 B1 | 10/2015 |
| KR | 10-2018-0035245 A | 4/2018 |

OTHER PUBLICATIONS

Masayuki Murata et al., "Intensify understanding through link to blog or website of own company/own store", Sales-increasing Facebook customer attraction and promotion, 2013, 4 pages, KiRAMEX CORPORATION, Japan.

"How to set URL information when sharing kakaotalk link", Posted on the internet Sep. 20, 2015, <URL: http://blog.naver.com/zeronetwork/220486507977>.

\* cited by examiner

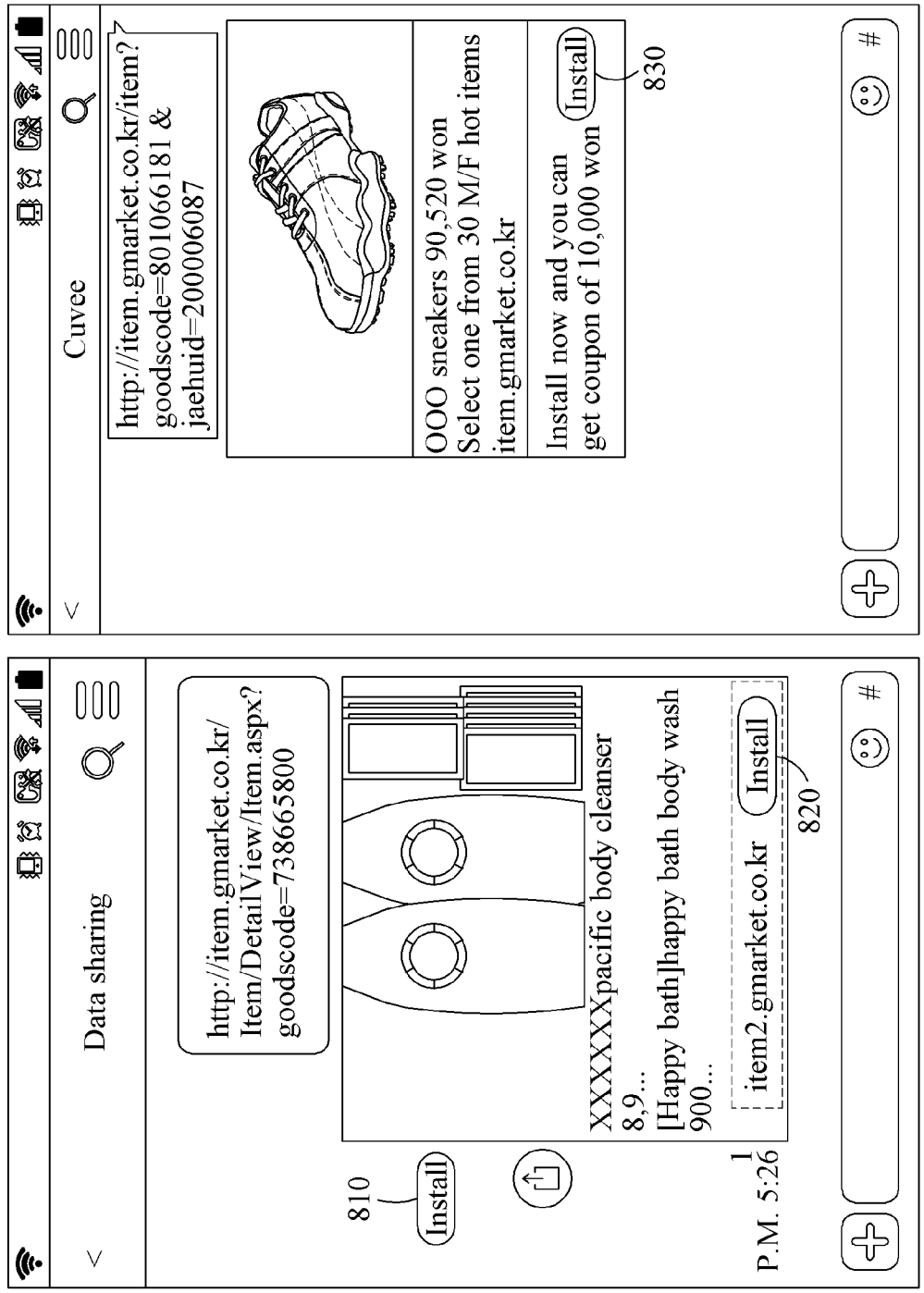

METHOD OF OPERATING A SERVER AND A USER TERMINAL FOR PROVIDING ADVERTISEMENT INFORMATION, AND APPARATUS THEREOF

CROSS-REFERENCE TO RELATED APPLICATION(S)

This application claims the priority benefit of Korean Patent Application No. 10-2016-0114554 filed on Sep. 6, 2016, in the Korean Intellectual Property Office, the disclosure of which is incorporated herein by reference for all purposes.

BACKGROUND

1. Field

One or more example embodiments relate to a method of operating a server and a user terminal to provide advertising information and an apparatus for performing the method.

2. Description of Related Art

An instant messaging service refers to a service that allows users to send and receive messages in real time in a chatroom for a one-to-one chat or a group chat over a network. The instant messaging service is provided through a message application. In particular, a variety of information may be shared among users through the message application.

A user that participates in a chatroom may use content by accessing a webpage corresponding to link information through the link information that is shared with a counter party. In this case, the user may use the content through a simple access to the webpage, and may not verify content that is provided from link information being shared in the chatroom before directly accessing the webpage.

Accordingly, there is a need for a technique that allows a user to verify additional information associated with link information shared in a chatroom or further detailed information in the chatroom although the user does not directly access a webpage. In addition, there is a need for a technique that may naturally display an advertising associated with link information shared in a chatroom for a user.

SUMMARY

According to an aspect of at least one example embodiment, there is provided a method of operating a server, the method including receiving a query from a user terminal of at least one user among users that participate in a chatroom, the query being created based on link information included in a message in the chatroom; acquiring advertising information corresponding to the link information; and providing a response signal that includes the advertising information to the user terminal in response to the query. The advertising information is determined to correspond to an entity that is determined based on the link information.

The advertising information may include at least one of an advertising that matches at least a portion of a uniform resource locator (URL) address included in the link information, an advertising that induces an installation of an application corresponding to the link information, and an advertising associated with content of a webpage. A type of the advertising information may include at least one of a banner type, a text type, an icon type, an emoticon type, an animation type, a moving picture type, and a sound type.

The method of operating the server may further include acquiring scrap information corresponding to a webpage accessible based on the link information. The response signal may further include the scrap information. The scrap information may include at least one of a constituent element of the webpage, metadata of the webpage, and a snap shot image of at least a portion of the webpage.

The providing of the response signal may include transmitting a response signal that includes the scrap information and the advertising information to a message server. The response signal may be transferred from the message server to user terminals of the users. The advertising information may be created based on at least one of common user information of the users that participate in the chatroom, a number of the users that participate in the chatroom, and entire link information shared in the chatroom.

The receiving of the query may include receiving an individual query that is created by a user terminal of each of the users, and the providing of the response signal may include transmitting a response signal corresponding to the individual query to the user terminal of each of the users. The advertising information may be created based on individual user information of each of the users, and the individual user information may include at least one of a gender, an age, a residential area, a hobby, and a social network service (SNS) activity of a corresponding user.

The method of operating the server may further include providing additional information based on individual user information that is received from the user terminal in response to receiving a selection from the user terminal on the displayed advertising information based on the response signal.

According to an aspect of at least one example embodiment, there is provided a method of operating a user terminal, the method including displaying a message using a first interface object in a chatroom; extracting link information from the message depending on whether the message includes the link information accessible to a webpage; creating a query that includes the link information; transmitting the query to a server; receiving a response signal that includes advertising information corresponding to the link information from the server, in response to the query; and displaying the advertising information using a third interface object distinguished from the first interface object in the chatroom. The advertising information is determined to correspond to an entity that is determined based on the link information.

The third interface object may include at least one of a banner object that displays the advertising information on an area adjacent to the first interface object, a text object, an icon object, an emoticon object, and an animation object based on a type of the advertising information.

The first interface object may include a speech balloon for displaying the message, and the second interface object may include a template for displaying the scrap information on an area adjacent to the speech balloon.

The displaying of the advertising information may include determining an area for displaying the advertising information based on the type of the advertising information; and displaying the third interface object that includes the advertising information on the determined area.

The third interface object may further include a sound object that plays the advertising information during displaying of the first interface object in the chatroom.

The method of operating the user terminal may further include displaying scrap information corresponding to the webpage using a second interface object distinguished from the first interface object and the third interface object in the chatroom.

The first interface object may include a speech balloon for displaying the message, and the second interface object may include a template for displaying the scrap information on an area adjacent to the speech balloon.

The creating of the query may include including information associated with the chatroom in the query. The advertising information may be created based on information associated with the chatroom.

The creating of the query may include including individual user information of the user terminal in the query, and the advertising information may be created based on the individual user information.

The method of operating the user terminal may further include receiving an input for selecting the displayed advertising information; providing individual user information of the user terminal to an advertising server corresponding to the advertising information; and receiving, from the advertising server, additional information that is created based on the advertising information and the individual user information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 8 illustrates an example of displaying advertising information on a user terminal according to an example embodiment.

DETAILED DESCRIPTION

Figure 1:
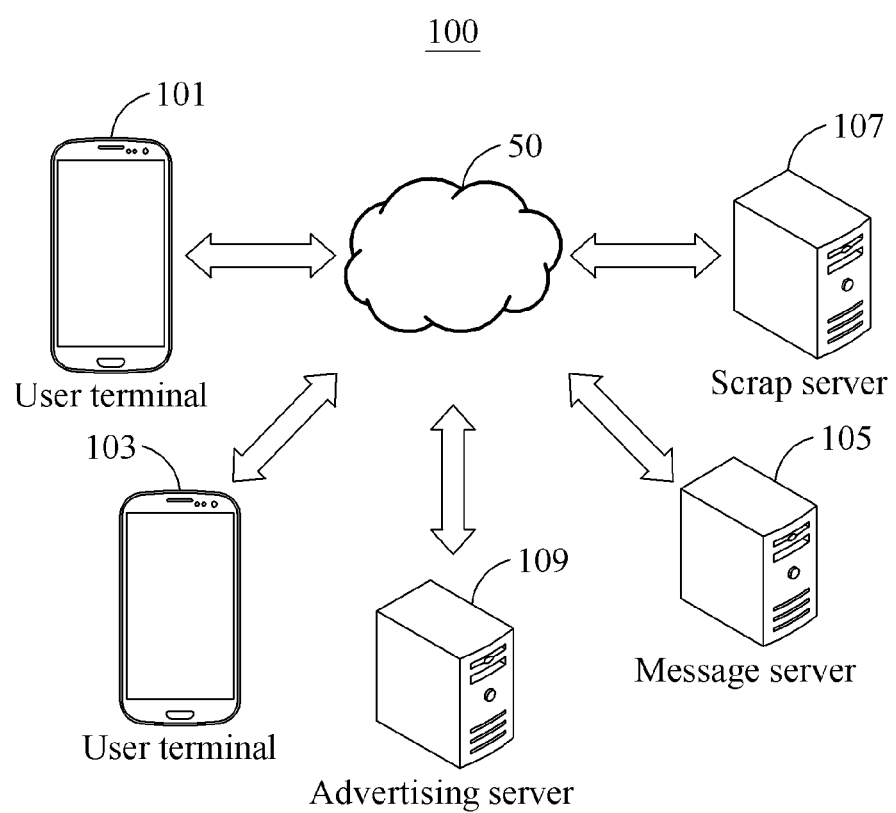
FIG. 1 is a diagram illustrating a configuration of a system for providing advertising information according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a diagram illustrating a configuration of a system for providing advertising information according to an example embodiment. Referring to FIG. 1, a system 100 for providing advertising information according to an example embodiment may include user terminals 101 and 103, a message server 105, and a scrap server 107. Although FIG. 1 illustrates that the message server 105 and the scrap server 107 are separate from each other, the scrap server 107 may be configured in a form of a module in the message server 105 depending on example embodiments. Also, the system 100 may further include an advertising server 109.

The user terminals 101 and 103, the message server 105, the scrap server 107, and the advertising server 109 may be connected to one another over a network 50. The network 50 enables wired/wireless communication between various entities included in the system 100. The network 50 may use standard communication technology and/or protocols.

Each of the user terminals 101 and 103 may refer to a terminal in which an instant message application capable of receiving advertising information is installed. For example, the user terminals 101 and 103 may be at least one of a terminal, a personal computer (PC), a tablet computer, a smartphone, a personal digital assistant (PDA), a wearable device, a game device, and a learning device.

The user terminals 101 and 103 may refer to terminals of users, for example, participants, that participate in a chatroom through the instant message application. Hereinafter, the terms "user" and "participant" may be interchangeably used throughout. For example, the user terminal 101 may be a terminal of a user that transmits a message in the chatroom and the user terminal 103 may be a terminal of a counter party that receives the message in the chatroom. The user terminal 101 and the user terminal 103 may participate in the chatroom that is created by the message server 105, and may exchange instant messages. Instant messages created through a message application may be displayed in the chatroom that is represented on screens of the user terminal 101 and the user terminal 103 of users participating in the chatroom. The chatroom may be one of, for example, a one-to-one chatroom in which two participants converse one to one and a group chatroom in which three or more participants converse as a group.

The user terminals 101 and 103 may share messages and other information that are transmitted and received using interface objects, for example, a speech balloon and a template distinguished from the speech balloon, displayed in the chatroom. Here, conversations may be transferred between a user and a counter party in a form of texts through a chatroom and link information, for example, a uniform resource locator (URL) may be shared. The link information may be shared through a chat window in such a manner that the user directly inputs the link information or the counter party transmits the link information to the user. The link information may include, for example, a URL address that connects to an accessible webpage through the network 50.

The message server 105 may be an instant messaging server configured to provide an instant messaging service to the user terminals 101 and 103 over the network 50. The message server 105 may provide an advertising service, a scrap service, and/or various services by interworking with the scrap server 107 and/or the advertising server 109 through various application programming interfaces (APIs).

The advertising service is a service that provides advertising information corresponding to link information shared in the chatroom. The advertising information may include, for example, an advertising that matches at least a portion of an URL address included in the link information, an advertising that induces an installation of an application corresponding to the link information, and an advertising associated with content of a webpage. The advertising information may be determined to correspond to an entity that is determined based on the link information.

In response to an input of a message including the link message to a chatroom from the user terminal 101, a message application of the user terminal 101 may verify whether the link information is included in the message input to the chatroom. The message application of the user terminal 101 may transmit a query that includes the link information to the scrap server 107 based on a determination that the link information is included in the message. The scrap server 107 may be configured in a form of a module in the message server 105. In this case, an operation of each of the message server 105 and the scrap server 107 may be performed by a single server, for example, the message server 105. The message application of the user terminal 101 may transmit the query to the message server 105. Hereinafter, for clarity of description, a description is made based on an example that the message server 105 and the scrap server 107 are separate from each other. However, the example embodiments may be applicable to a case in which the scrap server 107 is configured in the message server 105.

The scrap server 107 may acquire advertising information corresponding to the link information in response to the query, and may provide the advertising information to the message server 105 or the user terminal 101. According to an example embodiment, advertising information corresponding to link information may be stored in a database (not shown) of the scrap server 107. The advertising information corresponding to the link information may be uploaded and stored in the database in response to a request from an advertiser. In this case, the scrap server 107 may extract the advertising information corresponding to the link information from the database and may provide the extracted advertising information to the user terminal 101.

According to another example embodiment, the scrap server 107 may transmit a signal for requesting advertising information to the advertising server 109. In response to the signal for requesting the advertising information, the advertising server 109 may transmit the advertising information corresponding to the link information. The advertising server 109 may provide the advertising information based on the signal for requesting the advertising information. In this case, the scrap server 107 may provide the advertising information received from the advertising server 109 to the message server 105 or the user terminal 101.

The advertising server 109 may search for and/or extract advertising information based on link information received from the scrap server 107. At least a portion of the link information and the advertising information may be matched to each other and thereby stored in a database (not shown) of the advertising server 109. In this case, the advertising server 109 may extract, from the database, the advertising information that matches at least a portion of the link information. Alternatively, the advertising server 109 may search for appropriate advertising information based on a variety of information, for example, an entity that operates a webpage, an entity that provides a product or a service corresponding to the webpage, a type of content provided through the webpage, and a keyword associated with the content, that may be obtained by analyzing the link information.

The advertising server 109 may receive a variety of information associated with the link information from the scrap server 107. The scrap server 107 may analyze the link information and may acquire a variety of information, for example, an entity that operates a webpage, an entity that provides a product or a service corresponding to the webpage, a type of content provided through the webpage, and a keyword associated with the content, and may transmit a signal for requesting an advertising to the advertising server 109 based on the information acquired from the link information. In this case, the advertising server 109 may search for appropriate advertising information based on information received from the scrap server 107.

The scrap server 107 may additionally transmit, to the advertising server 109, information associated with a gender, an age, a residential area, a hobby, an SNS activity, etc., of a user that transmits the link information. Alternatively, the scrap server 107 may additionally transmit, to the advertising server 109, information associated with a chatroom in which the user that transmits the link information is participating, for example, a common matter of interest of participants of the chatroom, a number of participants of the chatroom, and entire link information shared in the chatroom. In this case, the advertising server 109 may search for appropriate advertising information based on corresponding information. For example, if four users participate in the chatroom, the advertising server 109 may search for advertising information associated with a 4-player game.

According to an example embodiment, the scrap server 107 may provide a scrap service. The scrap service may be a service that provides scrap information corresponding to a webpage of link information shared in a chatroom. The scrap information may include, for example, a constituent element, such as a text, an image, a moving picture, etc., of a webpage, metadata, such as a representative image, a description, a title, etc., extractable by parsing the webpage, and a snap shot image of at least a portion of the webpage.

In response to a query, the scrap server 107 may acquire scrap information corresponding to a webpage of link information and may provide the scrap information to the user terminal 101 or the message server 105. In detail, the scrap server 107 may receive the query that is created based on link information included in the message in the chatroom, from a user terminal of at least one user among users that participate in the chatroom. The scrap server 107 may access a webpage corresponding to the link information included in the query and may acquire scrap information of the webpage.

The scrap server 107 may analyze the link information and may verify an entity that operates the webpage corresponding to the link information. For example, if link information includes a URL "www.XXX.com/~~", the scrap server 107 may verify that the entity that operates the webpage is "XXX". Alternatively, the scrap server 107 may verify a category to which the link information belongs or a category to which the webpage corresponding to the link information belongs, based on the link information.

Alternatively, the scrap server 107 may analyze the webpage corresponding to the link information. The scrap server 107 may analyze the webpage corresponding to the link information and may acquire an analysis result of the webpage, for example, a type of content included in the webpage, a context of the content, and the like. For example, the scrap server 107 may analyze an attribute or context of content included in a webpage or may analyze an attribute of the webpage, for example, a category of the webpage, an inflow route of the webpage, an inflow keyword, mapping location information of the webpage, and the like.

In response to a query, the scrap server 107 may extract scrap information corresponding to a webpage and may transfer the extracted scrap information to the message server 105. According to an example embodiment, the scrap server 107 may transmit, to the message server 105, a response signal that includes scrap information and advertising information. In this case, the message server 105 may transmit a message input from the user terminal 101, the scrap information, and the advertising information to participants of the chatroom.

Accordingly, although the participants of the chatroom do not directly select link information shared in the chatroom and access the webpage, the participants may receive scrap information associated with the link information using interface objects in the chatroom. In addition, a company that provides an instant messaging service may naturally display advertising information associated with the link information for the participants of the chatroom using interface objects in the chatroom.

A message application of each of the user terminals 101 and 103 may display scrap information and advertising information received from the message server 105 on a chat window. Here, the message application may display the advertising information based on a type of the advertising information. The type of the advertising information may include a banner type, a text type, an icon type, an emoticon type, an animation type, a moving picture type, a sound type, or various combinations thereof.

According to the example embodiments, whether link information is included in a message is determined based on at least one of the user terminals 101 and 103. Accordingly, it is possible to prevent calculation load from concentrating on the message server 105. According to the example embodiments, the message server 105 may hook link information that is transferred from the user terminal 101 to the user terminal 103 through the chatroom and may display scrap information and advertising information through the scrap server 107 that is connected to the message server 105.

Figure 2A:
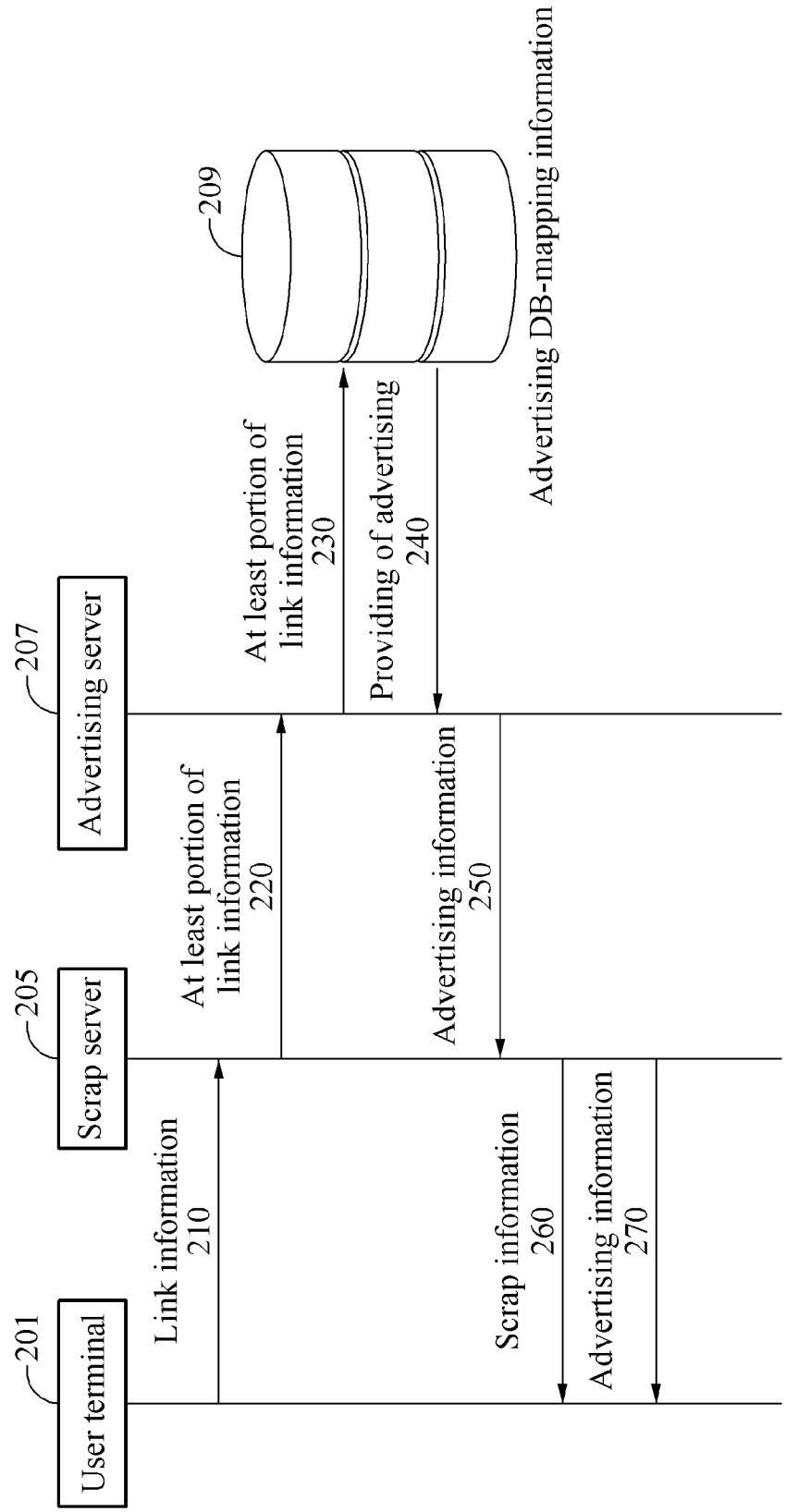
FIGS. 2A and 2B illustrate examples of an operation between components of a system for providing advertising information according to an example embodiment.
Figure 2B:
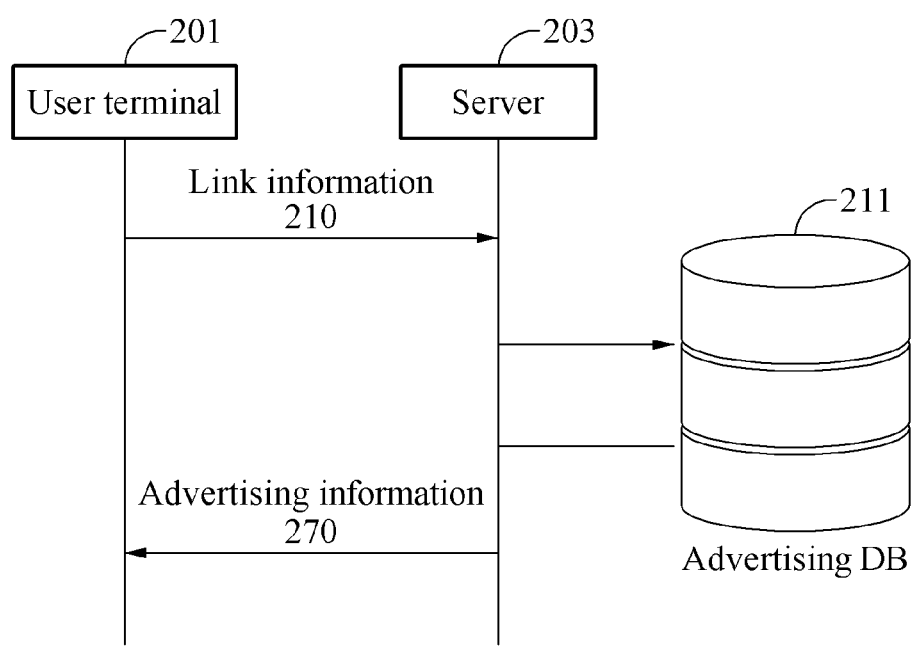

FIGS. 2A and 2B illustrate examples of an operation between components of a system for providing advertising information according to an example embodiment. Hereinafter, an operation among a user terminal 201, a scrap server 205, and an advertising server 207 to provide advertising information according to an example embodiment is described with reference to FIG. 2A.

In operation 210, the user terminal 201 may extract link information accessible to a webpage from a message in a chatroom and may transmit the extracted link information to the scrap server 205. For example, in response to an input of a message that includes link information through a message application of the user terminal 201, the message that includes the link information may be displayed on a first interface object in the chatroom that is represented on a screen of the user terminal 201. The first interface object may include, for example, a speech balloon for displaying a message.

When the message in the chatroom includes the link information accessible to the webpage, the user terminal 201 may extract an entire URL of the link information shared from the message in the chatroom and may transmit the extracted URL to the scrap server 205. Here, the user terminal 201 may create a query based on the extracted link information and may transmit the query that includes the link information to the scrap server 205.

The scrap server 205 may acquire advertising information based on at least a portion of the link information. In operation 220, the scrap server 205 may provide at least a portion of the link information received from the user terminal 201 to the advertising server 207.

For example, the scrap server 205 may acquire advertising information based on a basic URL corresponding to a portion of the entire link information or may acquire advertising information based on the entire link information or the remaining link information excluding the basic URL from the entire link information. Alternatively, the scrap server 205 may acquire advertising information based on information associated with a webpage. The scrap server 205 may also acquire advertising information from information associated with the webpage, for example, special sales information provided through the webpage and an advertising page in a popup form.

In an example in which link information received from the user terminal 201 includes "www.gmarket.co.kr, item2.gmarket.co.kr", the scrap server 205 may provide a basic URL, for example, "gmarket.co.kr", corresponding to at least a portion of the link information to the advertising server 207. In operation 230, the advertising server 207 may request an advertising database (DB) 209 for advertising information using the basic URL, for example, "gmarket.co.kr", corresponding to at least a portion of the link information. In operation 240, the advertising server 207 may receive an advertising that matches the basic URL from the advertising database 209. Here, an app identifier (ID) corresponding to the basic URL, a specific link for connection to an app store, and the like may be mapped in the advertising database 209.

As described above with reference to FIG. 1, the scrap server 205 may transmit a signal for requesting advertising information to the advertising server 207 based on at least a portion of the link information, information acquired by analyzing the link information, information associated with a user that transmits the link information, information associated with a chatroom in which the user that transmits the link information participates, or various combinations thereof. Also, the scrap server 205 may extract advertising information corresponding to the link information from a self-database without interworking with the advertising server 207, which is described with reference to FIG. 2B.

In operation 250, the advertising server 207 may provide the advertising information received from the advertising database 209 to the scrap server 205. In operation 270, the scrap server 205 may provide the advertising information received in operation 250 to the user terminal 201.

The advertising information may include, for example, a banner advertising corresponding to the link information, an advertising phrase corresponding to the link information, and information that induces an installation of an application corresponding to the link information. The banner advertising refers to a form of advertising that creates and attaches, for example, a form of a band on an Internet homepage and may be understood as a graphic image that attaches and promotes a name or content of a specific website on one side of a homepage. An advertiser that desires to post a banner advertising may pay a predetermined advertising fee for the advertising using a moving picture file in a predetermined standard. To analyze the advertising effect, the scrap server 205 may count a number of times that a banner advertising or information, for example, an app installation button, that induces an installation of an application is displayed for users, a number of times that the banner advertising or banner graphics is downloaded during a predetermined period of time, and a number of times that the app installation button is selected, and may provide the counted number of times to the advertising server 207.

The advertising information may be displayed on a chat window of a screen of the user terminal 201 using a third interface object. The third interface object may include a banner object that displays advertising information on an area adjacent to the first interface object or an area adjacent to a second interface object, a text object, an icon object, an emoticon object, an animation object, or various combinations thereof based on a type of the advertising information. The second interface object is described below.

In operation 260, the scrap server 205 may provide the scrap information to the user terminal 201. The scrap information may be displayed in the chatroom that is represented on the screen of the user terminal 201 using the second interface object. The second interface object may include a template for displaying scrap information on an area adjacent to the first interface object. Here, the scrap information may be acquired by the scrap server 205 through access to a webpage corresponding to link information.

For example, the scrap server 205 may analyze a webpage connected through link information and may acquire scrap information associated with the webpage, for example, a title, a simple description, and a representative image of the corresponding webpage. In detail, the scrap server 205 may parse a hypertext markup language (HTML) of the webpage and may acquire metadata, for example, a title, a simple description, and a representative image, from the webpage. The metadata may be represented in a code form on the webpage.

Alternatively, the scrap server 205 may capture the entire or a partial image of the webpage as scrap information associated with the webpage. The scrap server 205 may acquire a snap shot image of the entire page or a portion of the page connected through the link information, as the scrap information.

The aforementioned operation of acquiring, by the scrap server 205, the scrap information may be performed before or after receiving the advertising information in operation 250. Also, although FIG. 2A describes that the scrap server 205 preferentially transmits the scrap information prior to transmitting the advertising information, it is provided as an example only. The scrap server 205 may preferentially transmit the advertising information prior to transmitting the scrap information to the user terminal 201. Alternatively, the scrap server 205 may simultaneously transmit the scrap information and the advertising information.

Referring to FIG. 2B, a server 203 may receive link information from the user terminal 201 in operation 210, may extract advertising information corresponding to the link information from an advertising database (DB) 211, and may transmit the extracted advertising information to the user terminal 201 in operation 270. The server 203 may be a single server in which a message server and the scrap server 205 are integrated. The server 203 may transmit pre-registered advertising information to the user terminal 201 in response to a request from an advertiser, without a need to request the advertising server 207 for the advertising information.

Figure 3:
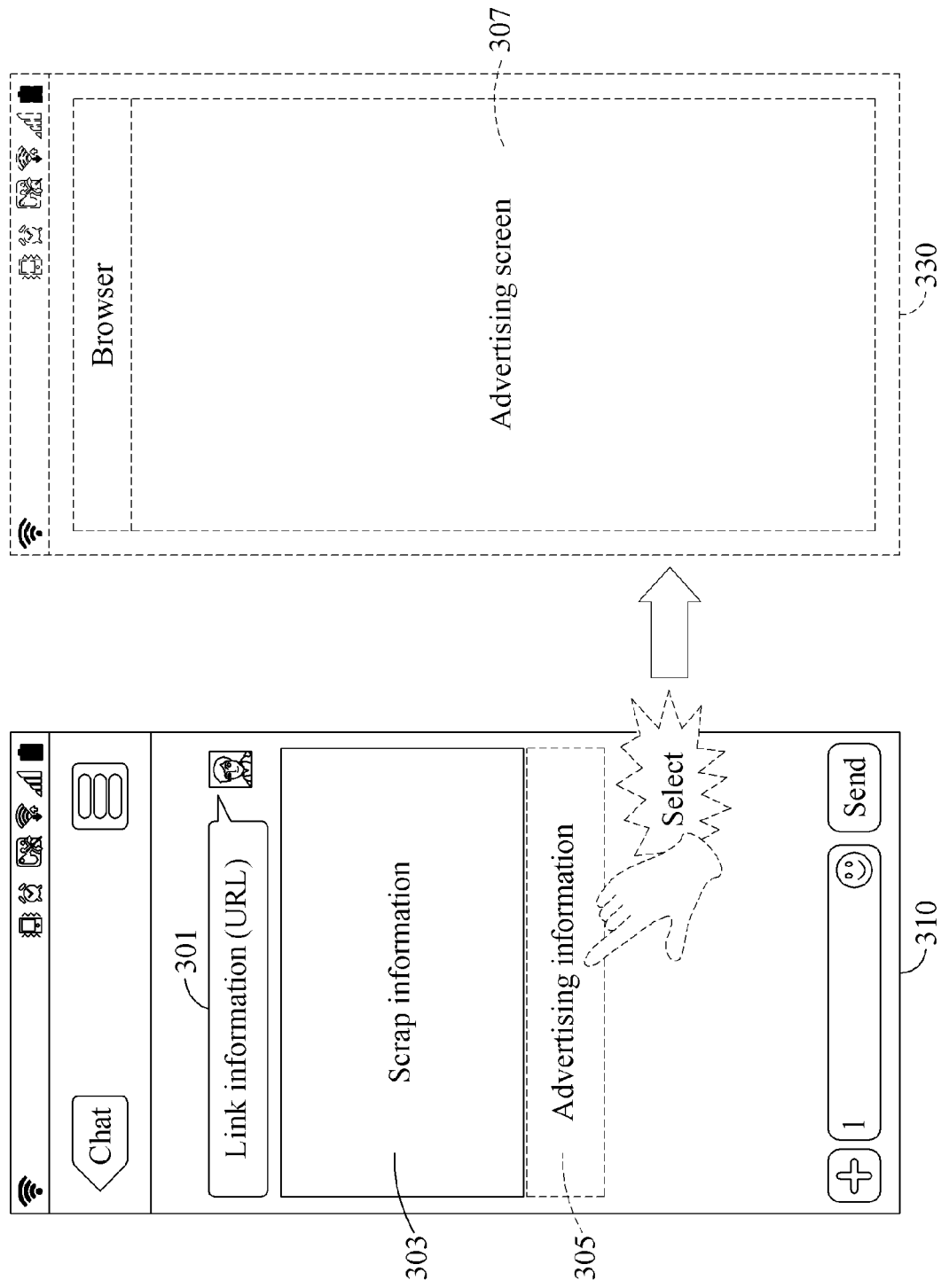
FIG. 3 illustrates an example of information displayed on a screen of a user terminal of a user that participates in a chatroom according to an example embodiment.

FIG. 3 illustrates an example of interface objects for displaying a message and a variety of information on a screen of a user terminal of a user that participates in a chatroom according to an example embodiment. FIG. 3 illustrates a chat window screen 310 displayed in response to a user accessing a chatroom through a message application that is executed on a user terminal of the user.

Link information, such as a URL, accessible to a webpage and scrap information corresponding to the webpage accessible through the link information may be displayed on the chatroom window screen 310. The link information may be displayed through a first interface object 301. The link information may be displayed with a message using a first interface object 301 and may be displayed separate from the message. The scrap information may be displayed using a second interface object 303 distinguished from the first interface object 301. As described above with FIG. 2A, the first interface object 301 may include a speech balloon for displaying a message and the second interface object 303 may include a template, for example, a scrap speech balloon, a preview area of content associated with a webpage, etc., distinguished from the speech balloon.

The link information displayed using the first interface object 301 or the scrap information displayed using the second interface object 303 may be selected by the user. In this case, a webpage corresponding to the link information and the scrap information may be displayed through a web browser dependent to the message application or a web browser independent from the message application.

Advertising information corresponding to the link information may be further displayed on a chat window. The advertising information may be displayed using a third interface object 305 distinguished from the first interface object 301 and the second interface object 303. For example, the third interface object 305 may be used to display the advertising information for the user by displaying the advertising information on a neighboring area of the speech balloon that includes the message or a neighboring area of the template that includes the scrap information.

In response to the user selecting the advertising information displayed using the third interface object 305, an advertising screen 330 corresponding to the advertising information may be displayed on the screen of the user terminal through the web browser and the like.

In response to the user selecting the advertising screen 330, a service page 307 associated with an advertising event or an advertising service may be displayed on the advertising screen 330. The service page may be a page displayed when an entity providing an instant messaging service or another entity having a collaboration relationship with the entity performs an expanded service or executes a service application associated with the expanded service.

Figure 4:
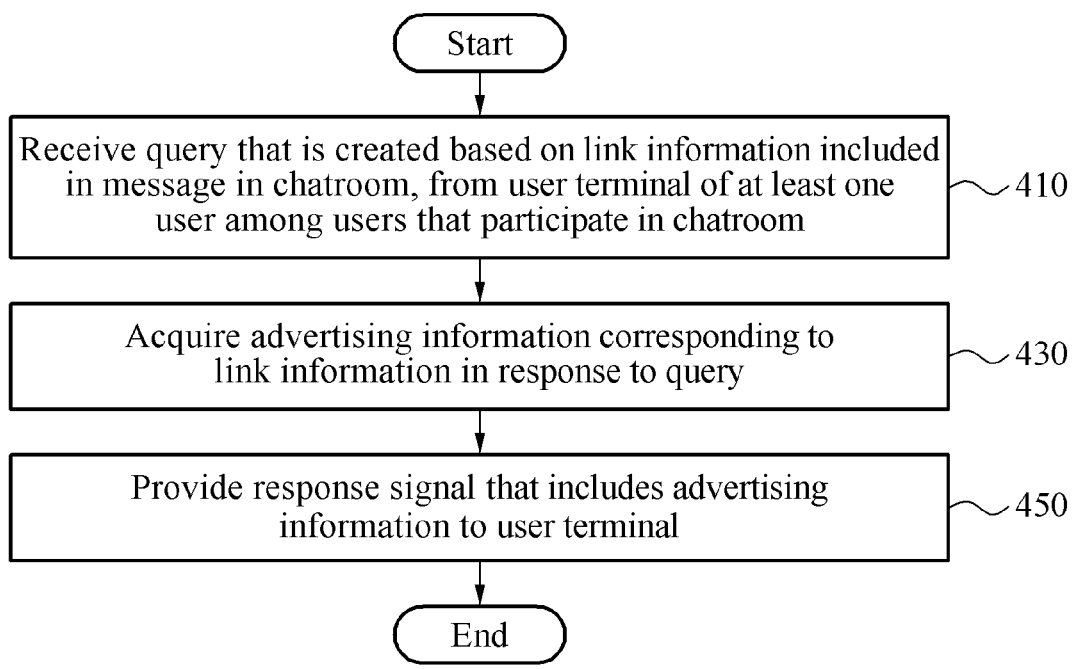
FIG. 4 is a flowchart illustrating a method of operating a server according to an example embodiment.

FIG. 4 is a flowchart illustrating a method of operating a server according to an example embodiment. Referring to FIG. 4, in operation 410, the server receives a query that is created based on link information included in a message in a chatroom, from a user terminal of at least one user among users that participate in the chatroom. Here, the server may correspond to the scrap server 107 or the message server 105 of FIG. 1.

In operation 430, the server acquires advertising information corresponding to the link information in response to the query. In operation 450, the server provides a response signal that includes the advertising information to the user terminal. Depending on example embodiments, the server may further acquire scrap information corresponding to a webpage of the link information in operation 430 and may further include the scrap information in the response signal in operation 450.

Depending on example embodiments, the advertising information may be created based on common user information or individual information of participants of the chatroom. A scenario of providing advertising information based on common user information of the participants of the chatroom is described with reference to FIG. 6, and a scenario of providing advertising information based on individual user information of each of the participants of the chatroom is described with reference to FIG. 7.

Figure 5:
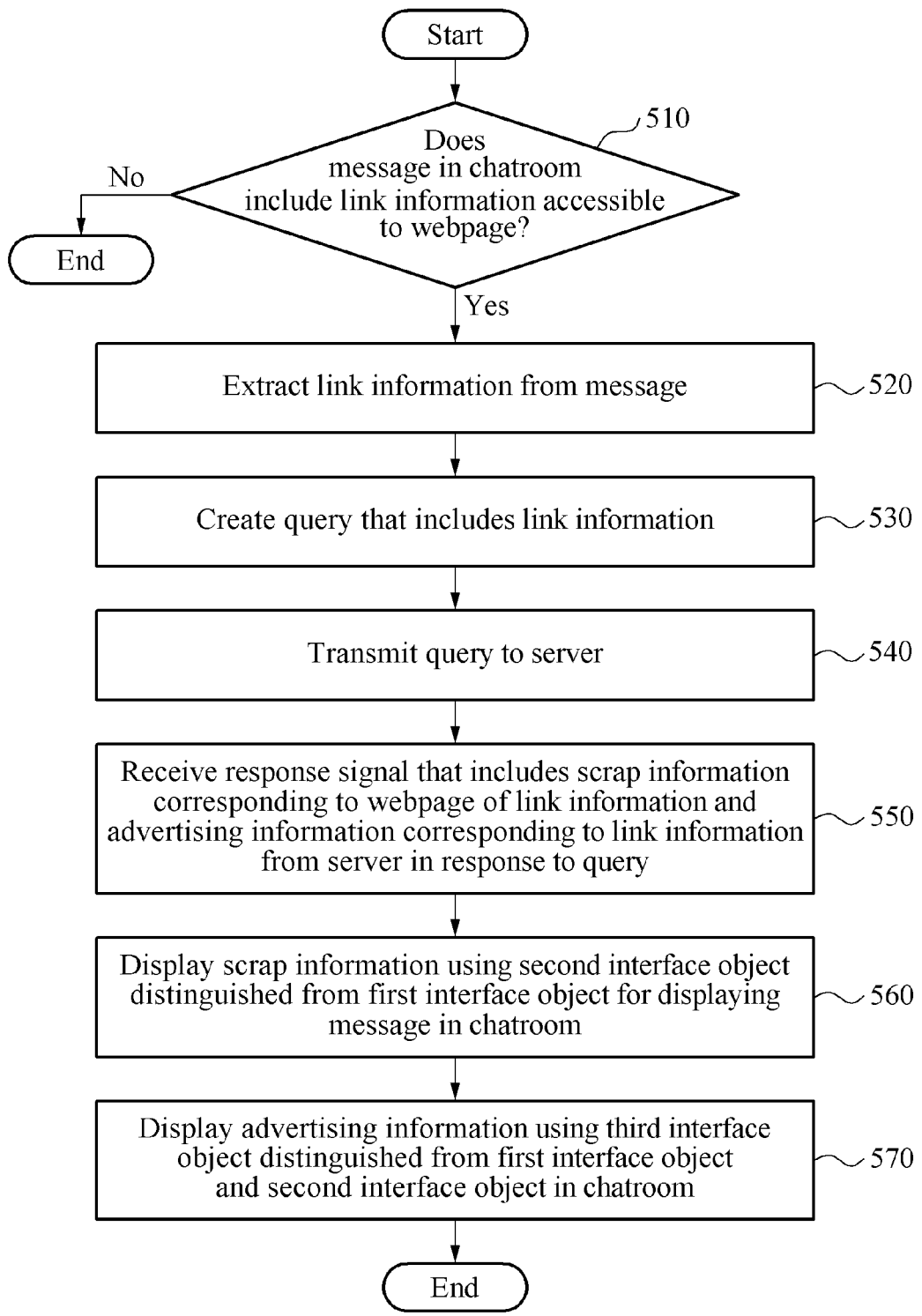
FIG. 5 is a flowchart illustrating a method of operating a user terminal according to an example embodiment.

FIG. 5 is a flowchart illustrating a method of operating a user terminal according to an example embodiment. Referring to FIG. 5, in operation 510, the user terminal may determine whether a message in a chatroom includes link information accessible to a webpage. For example, the user terminal may determine whether the message in the chatroom includes the link information depending on whether the message in the chatroom includes a specific word or phrase, such as "www.~", "~co.kr", etc., used to access the webpage, or whether the message in the chatroom includes specific metadata.

When the message in the chatroom includes the link information in operation 510, the user terminal extracts the link information from the message in operation 520. In operation 530, the user terminal creates a query that includes the link information. The query may further include information associated with the chatroom or user information of the user terminal that creates the query in addition to the link information. In operation 540, the user terminal transmits the query to a server. In response to the query, the user terminal receives a response signal that includes the scrap information and the advertising information from the server in operation 550.

For example, the user terminal may analyze information associated with a chatroom and individual user information of each of the participants of the chatroom and may create a query based on an analysis result. In an example in which user information of a user X' of a user terminal X includes an age as 25, a gender as a female, an SNS activity as being active, a hobby as sports, and an occupation as a student, the user terminal may analyze the user information and may analyze the user X' as a "female that actively performs SNS activities and physical activities". The user terminal may create a query that includes information indicating the user X' as a female that actively performs social activities and physical activities based on an analysis result. In this case, the user terminal may receive, from the server, advertising information of content or a display form preferred by the female that actively performs social activities and physical activities.

Here, instead of directly analyzing user information, the user terminal may include a user ID in the query and may transmit the query to the server. In this case, the server may acquire and analyze the user information based on the user ID included in the query, and may acquire the aforementioned information.

In an example in which participant information of a chatroom C in which a user of a user terminal Y participates includes an average age as 52, a main age group as late 40s, a gender as a male, an SNS activity as being inactive, and a common hobby as mountain climbing, the user terminal may analyze participant information of the chatroom C and may analyze participants of the chatroom C as "middle-aged males that show inactive SNS activities and active physical activities". The user terminal may create a query that includes information indicating that middle-aged males showing inactive SNS activities and active physical activities are participating based on an analysis result. In this case, the user terminal may receive hiking advertising or mountain-climbing equipment advertising associated with a mountain climbing that is a common matter of interest or a common hobby of participants of the chatroom C.

Here, instead of directly analyzing information of participants of a chatroom, the user terminal may include a chatroom ID, a number of participants of the chatroom, profile information of the participants of the chatroom, etc., in the query, and may transmit the query to the server. In this case, the server may acquire and analyze information associated with users that participate in the chatroom based on the chatroom ID included in the query, and may acquire the aforementioned information.

In operation 560, the user terminal displays scrap information using a second interface object distinguished from a first interface object for displaying a message in the chatroom. In operation 570, the user terminal displays advertising information using a third interface object distinguished from the first interface object and the second interface object in the chatroom.

Figure 6:
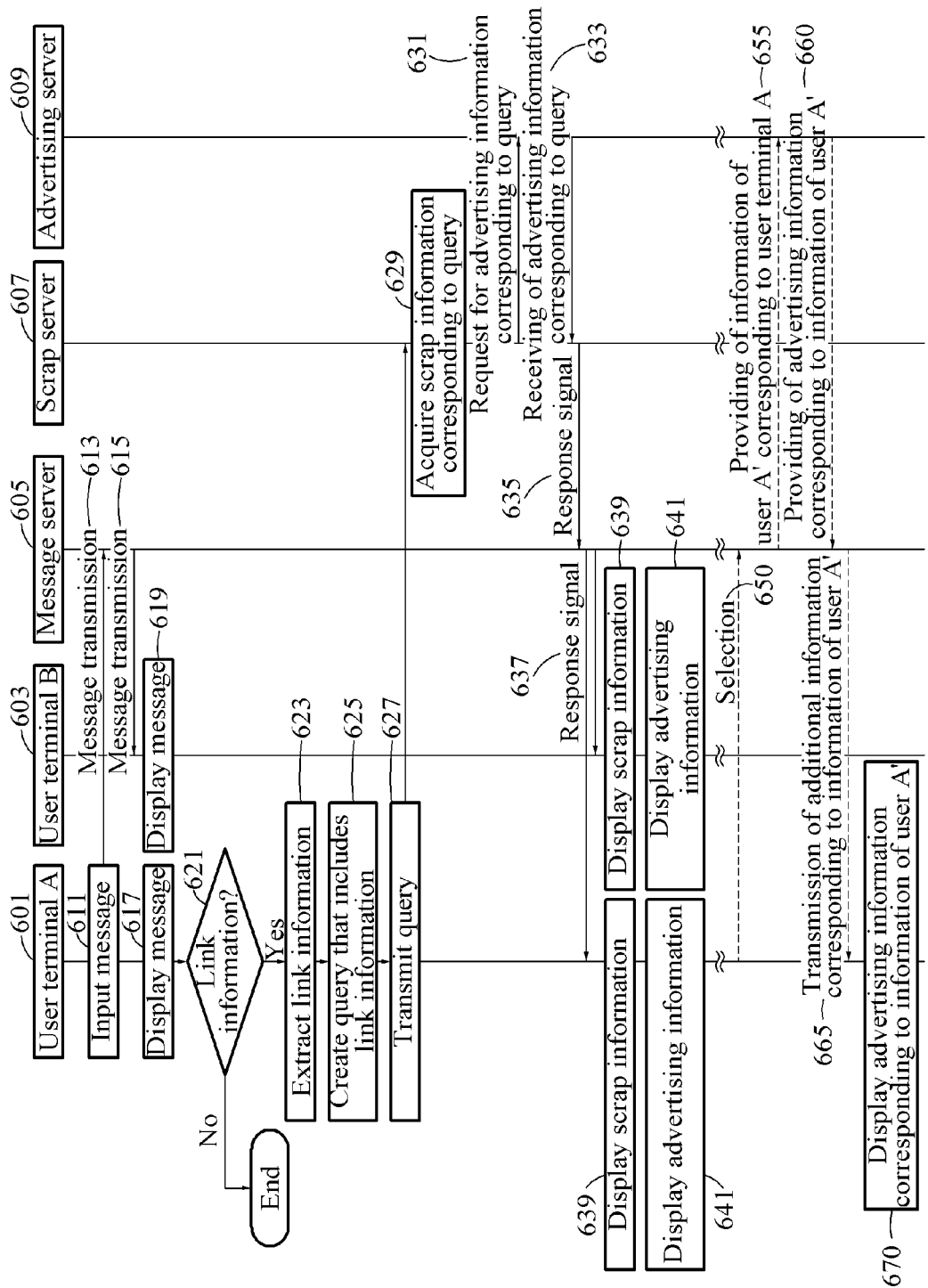
FIGS. 6 and 7 illustrate examples of an operation among user terminals, a scrap server, a message server, and an advertising server according to an example embodiment.

FIG. 6 illustrates an example of an operation among user terminals, a scrap server, a message server, and an advertising server according to an example embodiment. Hereinafter, an example embodiment in which a scrap server 607 transmits the same response signal to a user terminal A 601 and a user terminal B 603 of users in a chatroom through a message server 605 is described with reference to FIG. 6. Depending on example embodiments, advertising information included in the response signal may be created based on common user information of users in the chatroom.

In response to an input of a message to a chat window from a user A of the user terminal A 601 in operation 611, the input message may be transmitted to the message server 605 in operation 613. The input image may be displayed in a chatroom on a chat window screen of the user terminal A 601 in operation 617. In operation 615, the message server 605 transmits the message received from the user terminal A 601 to the user terminal B 603. In operation 619, the message transmitted from the user terminal A 601 may be displayed in a chatroom on a chat window screen of the user terminal B 603.

Although not illustrated, the message input to the user terminal A 601 may be transmitted again to the user terminal A 601 through the message server 605 instead of being directly displayed in the chatroom on the chat window screen of the user terminal A 601. Similar to the user terminal B 603, the user terminal A 601 may receive the message from the message server 605 and may display the message in the chatroom.

In operation 621, the user terminal A 601 may determine whether the message in the chatroom includes link information. When the message is determined to not include the link information in operation 621, an operation of the user terminal A 601 may be terminated.

When the message is determined to include the link information in operation 621, the user terminal A 601 may extract the link information from the message in operation 623. In operation 625, the user terminal A 601 may create a query that includes the link information. The created query may include information, for example, a chatroom ID, associated with the chatroom in which users participate. Depending on example embodiments, the user terminal A 601 may directly provide participant information of the chatroom in which users participate to the scrap server 607 or may provide the participant information to the scrap server 607 through the message server 605.

In operation 627, the user terminal A 601 may transmit the created query to the scrap server 607. In operation 629, the scrap server 607 may acquire scrap information corresponding to the query transmitted in operation 627. Depending on example embodiments, the scrap server 607 may receive advertising information from the advertising server 609, or may also acquire advertising information from a self-database (not shown) and then acquire scrap information.

In operation 631, the scrap server 607 may request the advertising server 609 for advertising information corresponding to the query. In operation 633, the scrap server 607 may acquire the advertising information corresponding to the query, that is, the advertising information corresponding to link information based on the query. Depending on example embodiments, instead of requesting the advertising server 609 for advertising information, the scrap server 607 may acquire advertising information corresponding to link information from the database (not shown).

In operation 635, the scrap server 607 may transmit, to the message server 605, a response signal that includes the scrap information acquired in operation 629 and the advertising information received in operation 633. In operation 637, the message server 605 may transmit the response signal to the user terminal A 601 and the user terminal B 603.

In operations 639 and 641, the user terminal A 601 and the user terminal B 603 may display the scrap information and the advertising information that are included in the received response signal on the corresponding chat window screen. The scrap information and the advertising information may be displayed in the chatroom using different interface objects, respectively. Here, the advertising information displayed on the user terminal A 601 and the user terminal B 603 is based on participant information of the chatroom and may be an advertising associated with a common matter of interest of participants, that is, users of the chatroom or an advertising customized for the participants of the chatroom.

In an example in which participant information of a chatroom includes a gender as a male, an average age as 50s, and an occupation as a salesman with respect to participants, that is, users of the chatroom, the advertising information may include advertisings associated with dietary supplements, sporting goods, etc., in which the participants of the chatroom may be interested. Alternatively, in an example in which participant information of a chatroom includes a gender as a female, an average age as 30s, an occupation as a housewife or a saleswoman with respect to participants of the chatroom, the advertising information may include advertisings associated with cosmetic sales, a tour, a childrearing product, etc., in which the participants of the chatroom may be interested Hereinafter, an example embodiment of displaying the same advertising information for participants of a chatroom and, in this instance, additionally providing customized information for a user that selects the corresponding advertising information is described.

In an example in which the user of the user terminal A 601 among users that receives advertising information accesses the advertising information by selecting a banner advertising, an advertising phrase, etc., displayed on the screen in operation 650, the message server 605 may recognize that the user of the user terminal A 601 accesses the advertising information and may provide information of a user A' corresponding to the user terminal A 601 to the advertising server 609 in operation 655. Although not illustrated, information of the user A' may be directly transferred from the user terminal A 601 to the advertising server 609 depending on example embodiments.

In operation 660, the advertising server 609 may search for additional information corresponding to information of the user A' from an advertising database and may provide the additional information, for example, an advertising that matches information of the user A', to the message server 605. The additional information may include purchase information, discount information, coupon information, assessment information, etc., associated with the advertising information.

In operation 665, the message server 605 may transmit the additional information corresponding to information of the user A' to the user terminal A 601. In operation 670, the user terminal A 601 may display the additional information corresponding to the information of the user A' on the chat window screen. Although not illustrated, the advertising server 609 may directly provide the additional information to the user terminal A 601 depending on example embodiments. The advertising server 609 may be a server that is operated by an advertiser.

Figure 7:
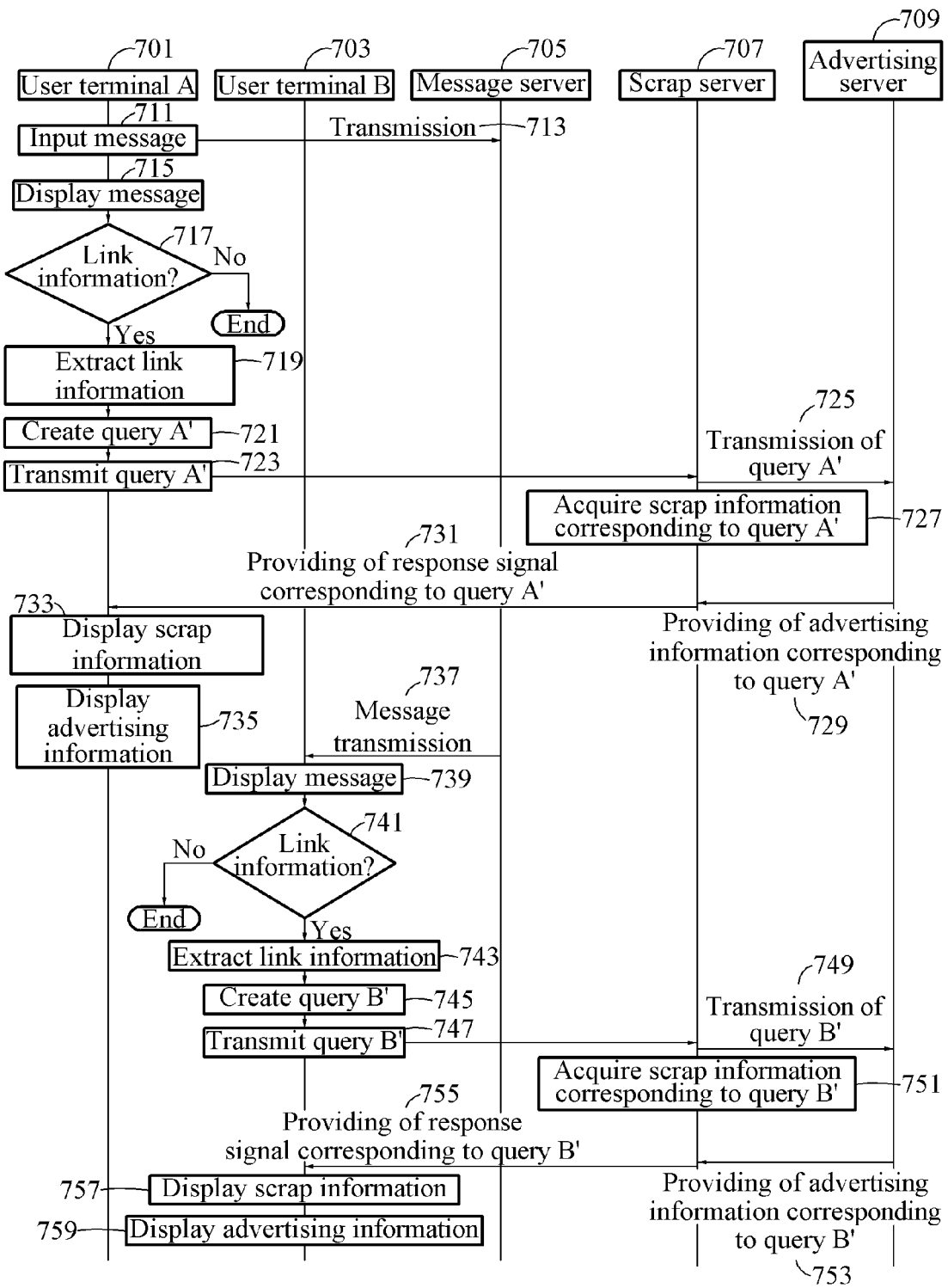

FIG. 7 illustrates another example of an operation among user terminals, a scrap server, a message server, and an advertising server according to an example embodiment. Hereinafter, an example embodiment in which each of a user terminal A 701 and a user terminal B 703 of users in a chatroom transmits an individual query to a scrap server 707 and the scrap server 707 transmits a response signal corresponding to the individual query to each of the user terminal A 701 and the user terminal B 703. Depending on example embodiments, advertising information included in the response signal may be created based on individual user information of a user that requests the individual query. For example, the individual query may include a user ID of a corresponding user terminal.

In response to an input of a message to a chat window from a user of the user terminal A 701 in operation 711, the input message may be transmitted to a message server 705 in operation 713. The input message may be displayed in a chatroom on a chat window screen of the user terminal A 701 in operation 715. Although not illustrated, the message input from the user terminal A 701 may be transmitted to the message server 705 and the message transmitted from the message server 705 to the user terminal A 701 may be displayed in the chatroom.

In operation 717, the user terminal A 701 may determine whether a message in the chatroom includes link information. When the message included in the chatroom is determined to not include the link information in operation 717, an operation of the user terminal A 701 may be terminated.

When the message is determined to include the link information in operation 717, the user terminal A 701 may extract the link information from the message in operation 719. In operation 721, the user terminal A 701 may create a query A' that includes the link information. Here, the created query A' may include individual user information of the user terminal A 701. The user terminal A 701 may analyze individual user information of the user of the user terminal A 701 and may create the query A' based on an analysis result.

Depending on example embodiments, the user terminal A 701 may separately provide individual user information of a corresponding user, for example, the user of the user terminal A 701, to the scrap server 707. Alternatively, the message server 705 may also provide the individual user information of the user to the scrap server 707.

In operation 723, the user terminal A 701 may transmit the created query A' to the scrap server 707. In operation 725, the scrap server 707 may transmit the query A' to an advertising server 709. In operation 727, the scrap server 707 may acquire scrap information corresponding to the query A'.

In operation 729, the advertising server 709 may provide advertising information corresponding to the query A' to the scrap server 707. In operation 731, the scrap server 707 may provide a response signal, for example, the scrap information and the advertising information, corresponding to the query A' to the user terminal A 701. In operations 733 and 735, the user terminal A 701 may display the scrap information and the advertising information included in the response signal corresponding to the query A' on the chat window screen.

In operation 737, the message server 705 may transmit, to the user terminal B 703, the message that is received from the user terminal A 701 in operation 711. In operation 739, the message transmitted from the user terminal A 701 may be displayed on a chat window screen of the user terminal B 703.

In operation 741, the user terminal B 703 may determine whether the message in the chatroom includes link information. When the message in the chatroom is determined to not include the link information in operation 741, an operation of the user terminal B 703 may be terminated.

When the message is determined to include the link information in operation 741, the user terminal B 703 may extract the link information from the message in operation 743. In operation 745, the user terminal B 703 may create a query B' that includes the link information. Here, the created query B' may include individual user information of the user terminal B 703. The user terminal B 703 may analyze individual user information of the user terminal B 703 and may create the query B' based on an analysis result.

Depending on example embodiments, the user terminal B 703 may separately provide individual user information of a corresponding user, for example, the user of the user terminal B 703, to the scrap server 707. Alternatively, the message server 705 may provide the individual user information of the user to the scrap server 707.

In operation 747, the user terminal B 703 may transmit the created query B' to the scrap server 707. In operation 749, the scrap server 707 may transmit the query B' to the advertising server 709. In operation 751, the scrap server 707 may acquire scrap information corresponding to the query B'. In operation 753, the advertising server 709 may provide advertising information corresponding to the query B' to the scrap server 707. In operation 755, the scrap server 707 may provide a response signal, for example, the scrap information and the advertising information, corresponding to the query B' to the user terminal B 703. In operations 757 and 759, the user terminal B 703 may display the scrap information and the advertising information included in the response signal corresponding to the query B' on the chat window screen.

FIG. 8 illustrates an example of displaying advertising information on a user terminal according to an example embodiment. FIG. 8 illustrates various areas on which a third interface object including advertising information may be displayed. As described above, the advertising information may include, for example, a banner advertising corresponding to link information, an advertising phrase corresponding to the link information, and information that induces an installation of an application corresponding to the link information,. The banner advertising or the advertising phrase may be displayed with information that induces the installation of the application.

The advertising information may be readily displayed on any of areas of a chat window unless displaying of the advertising information interferes with an operation of a user interface of a speech balloon for representing scrap information and/or a message in a chatroom.

A method of displaying advertising information may vary based on a type of the advertising information. For example, when advertising information is a banner advertising or an advertising phrase corresponding to link information, the advertising information may be displayed in a banner form at a lower end of a template that includes scrap information.

Also, when advertising information is information that induces an installation of an application corresponding to link information, the advertising information may be displayed in a form of an app installation button. In this case, the app installation button may be displayed at a variety of locations, for example, a neighboring area of a speech balloon that includes a message, a neighboring area 810 of a template that includes scrap information, an empty space 820 within the template that includes the scrap information, and an empty space 830 within an interface object for displaying various types of advertising information.

Although not illustrated, a server (hereinafter, referred to as a server) for providing advertising information according to an example embodiment includes a communication interface, a processor, and a memory. The communication interface, the processor, and the memory may be connected through a communication bus for interconnection between constituent elements. The communication bus may include a circuit that controls communication between constituent elements of a system and interconnects the constituent elements.

The server may be, for example, a single server computer or a system similar thereto, or may be one or more server banks or a plurality of servers that are aligned in different alignments. The server may be provided in single facility or may be provided as a cloud of servers that are distributed at different geographical locations.

The communication interface enables communication between the server and different apparatuses through at least one communication network. The communication interface receives a query that is created based on link information included in a message in a chatroom, from a user terminal of at least one user among users that participate in the chatroom. In response to the query, the processor acquires scrap information corresponding to a webpage of the link information and advertising information corresponding to the link information. The communication interface provides a response signal that includes the scrap information and the advertising information to the user terminal. The memory may store instructions for executing the processor, and may store the scrap information and the advertising information.

The aforementioned example embodiments may be implemented using hardware components, software components, and/or a combination thereof. For example, the apparatuses, the methods, and the components described herein may be implemented using one or more general-purpose computers or special purpose computers, such as, for example, a processor, a controller, a central processing unit (CPU), a graphics processing unit (GPU), an arithmetic logic unit (ALU), a digital signal processor, a microcomputer, a field programmable gate array (FPGA), a programmable logic unit (PLU), a microprocessor, an application specific integrated circuit (ASIC), or any other device capable of executing and responding to instructions in a defined manner.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of operating an advertising system comprising a user terminal and a scrap server, the method comprising:
    displaying, by the user terminal, a message on a first interface object, in a chatroom;
    monitoring, by the user terminal, whether the message includes link information accessible to a webpage, wherein the link information includes a URL address of the webpage;
    based on a monitoring result that the message includes the link information, extracting, by the user terminal, the URL address from the message;
    creating, by the user terminal, a query that includes the URL address;
    transmitting, by the user terminal, the query that includes the URL address to the scrap server and the message to a message server, separately;
    in response to the query, accessing, by the scrap server, the webpage and acquiring, by the scrap server, scrap information of the webpage, wherein the scrap information includes both i) a representative image of the webpage and ii) a textual description of the webpage, but not an entire content of the webpage corresponding to the URL address;
    acquiring, by the scrap server, advertising information based on the scrap information;
    receiving, by the user terminal, a response signal that includes both i) the scrap information of the webpage and ii) the advertising information, from the scrap server; and
    processing signals, by the user terminal, to display the scrap information on a second interface object distinguished from the first interface object and the advertising information on a third interface object distinguished from the first interface object and the second interface object, in the chatroom, while the user terminal does not have the entire content of the webpage,
    wherein the user terminal is a smartphone,
    wherein, while the user terminal displays the scrap information in the chatroom, the user terminal does not display the entire content of the webpage,
    wherein the advertising information is associated with at least one of content of the webpage and a hostname of the webpage,
    wherein the first interface object comprises a speech balloon for displaying the message,
    the second interface object comprises a template for displaying the scrap information on an area adjacent to the speech balloon, and
    the template includes a first sub-part for displaying the representative image and a second sub-part for displaying the textual description.

2. The method of claim 1, wherein the third interface object comprises at least one of a banner object that displays the advertising information on an area adjacent to the first interface object, a text object, an icon object, an emoticon object, and an animation object based on a type of the advertising information.

3. The method of claim 2, wherein the displaying of the advertising information comprises:
    determining, by the user terminal, an area for displaying the advertising information based on the type of the advertising information; and
    displaying, by the user terminal, the third interface object that includes the advertising information on the determined area.

4. The method of claim 2, wherein the third interface object further comprises a sound object that plays the advertising information during displaying of the first interface object in the chatroom.

5. The method of claim 1, wherein the creating of the query comprises including information associated with the chatroom in the query, and
    the advertising information is created based on information associated with the chatroom.

6. The method of claim 1, wherein the creating of the query comprises including individual user information of the user terminal in the query, and the advertising information is created based on the individual user information.

7. The method of claim 1, further comprising:

receiving, by the user terminal, an input for selecting the displayed advertising information;

providing, by the user terminal, individual user information of the user terminal to an advertising server corresponding to the advertising information in response to the receiving of the input; and receiving, by the user terminal, from the advertising server, additional information that is created based on the advertising information and the individual user information.

8. A non-transitory computer-readable recording medium storing instructions that, when executed by a processor, cause the processor to perform the method of claim 1.

* * * * *